United States Patent
Lawson

(10) Patent No.: US 9,921,122 B2
(45) Date of Patent: Mar. 20, 2018

(54) TORQUE WRENCH CALIBRATION

(71) Applicant: NORBAR TORQUE TOOLS LTD, Banbury, Oxfordshire (GB)

(72) Inventor: Steve Lawson, Banbury (GB)

(73) Assignee: NORBAR TORQUE TOOLS, LTD., Banbury, Oxfordshire (GB)

(*) Notice: Subject to any disclaimer, the term of this patent is extended or adjusted under 35 U.S.C. 154(b) by 105 days.

(21) Appl. No.: 14/410,446

(22) PCT Filed: Jun. 21, 2013

(86) PCT No.: PCT/GB2013/051631
§ 371 (c)(1),
(2) Date: Dec. 22, 2014

(87) PCT Pub. No.: WO2014/001768
PCT Pub. Date: Jan. 3, 2014

(65) Prior Publication Data
US 2015/0369686 A1 Dec. 24, 2015

(30) Foreign Application Priority Data
Jun. 25, 2012 (GB) .................................. 1211250.4

(51) Int. Cl.
*G01L 25/00* (2006.01)
*G01L 5/24* (2006.01)
*B25B 23/142* (2006.01)

(52) U.S. Cl.
CPC ........ *G01L 25/003* (2013.01); *B25B 23/1422* (2013.01); *G01L 5/24* (2013.01)

(58) Field of Classification Search
CPC ...... B25B 23/1422; G01L 25/003; G01L 5/24
(Continued)

(56) References Cited

U.S. PATENT DOCUMENTS 2,648,219 A * 8/1953 Emery .................. G01L 25/003
73/862.08
2,909,055 A * 10/1959 Fish ........................ G01L 25/00
119/51.11
(Continued)

FOREIGN PATENT DOCUMENTS

CN 2228656 Y 6/1996
CN 201653644 U 11/2010
(Continued)

OTHER PUBLICATIONS

Response to the Office Action dated Jun. 21, 2011 in U.S. Appl. No. 12/380,517 dated Oct. 4, 2011 (11 pages).
(Continued)

*Primary Examiner* — Helen Kwok
*Assistant Examiner* — Nashmiya Fayyaz
(74) *Attorney, Agent, or Firm* — Withrow & Terranova, P.L.L.C.; Vincent K. Gustafson

(57) ABSTRACT

A calibration rig (1), for calibrating a torque wrench (9), comprises a support structure (3) for supporting the torque wrench (9) during calibration. The support structure (3) comprises: a support member (7) which is free to move substantially vertically; means for applying a balance force (14, 15) to the support member (7), wherein the balance force acts counter to a force exerted by the weight of the torque wrench (9) when a handle of the torque wrench (9) is received by the support member (7); means for applying a measured torque (6) to the torque wrench (7); and means for resisting rotation (16) of the torque wrench (9) as a result of the applied torque.

21 Claims, 5 Drawing Sheets

(58) Field of Classification Search
USPC .......................................................... 73/1.12
See application file for complete search history.

(56) References Cited

U.S. PATENT DOCUMENTS

| | | | |
|---|---|---|---|
| 5,353,654 | A | 10/1994 | Lin |
| 7,594,446 | B2 | 9/2009 | Schwafertz |
| 8,117,887 | B2 * | 2/2012 | Schwafertz ........... G01L 25/003 73/1.01 |
| 8,713,986 | B2 | 5/2014 | Hsieh |
| 2009/0217773 | A1 | 9/2009 | Schwafertz et al. |
| 2010/0270721 | A1 | 10/2010 | Liu |

FOREIGN PATENT DOCUMENTS

| | | |
|---|---|---|
| DE | 19925079 A1 | 12/2000 |
| DE | 202006018352 U1 | 2/2007 |
| SU | 1654693 A1 | 6/1991 |
| TW | 201207364 A1 | 2/2012 |
| WO | 2009129970 A1 | 10/2009 |

OTHER PUBLICATIONS

International Search Report and Written Opinion for International Patent Application No. PCT/GB2013/051631, dated Sep. 5, 2013, 10 pages.
Search Report for United Kingdom Patent Application No. GB 1211250.4 dated Oct. 12, 2012, 2 pages.
International Preliminary Report on Patentability for International Patent Application No. PCT/GB2013/051631, dated Jan. 8, 2015, 8 pages.

* cited by examiner

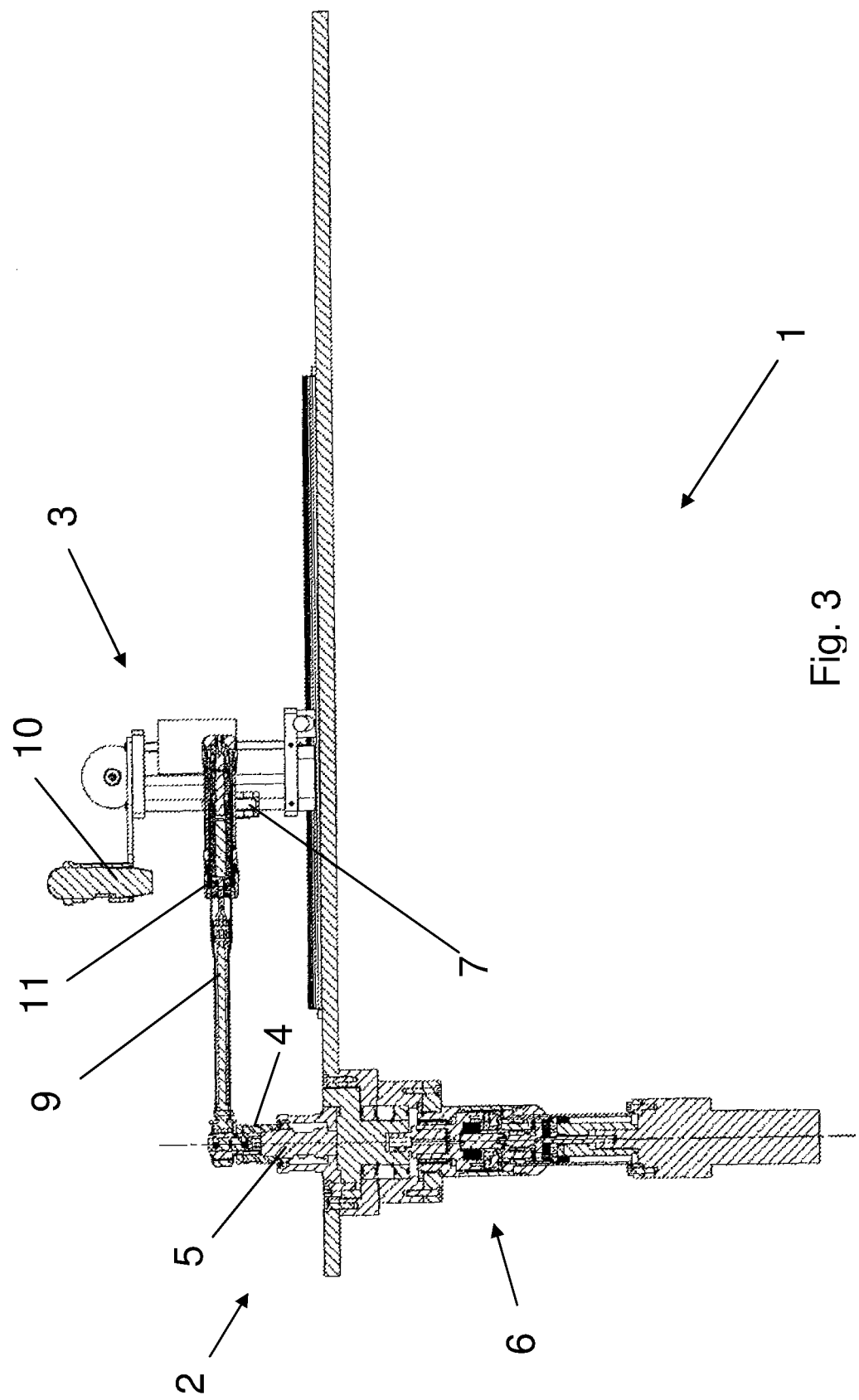

TORQUE WRENCH CALIBRATION

This application is a 35 U.S.C. §371 national phase filing of International Patent Application No. PCT/GB2013/051631 filed on Jun. 21, 2013, which claims the benefit of United Kingdom Patent Application No. 1211250.4 filed on Jun. 25, 2012. The entire disclosures of the foregoing patent applications are incorporated by reference herein in their respective entireties.

This invention relates to torque wrenches, and in particular to calibration of torque wrenches.

In many applications, fasteners such as nuts and bolts must be tightened to a specific tension. In practice, the tension of such fasteners is difficult to measure directly, but a fastener may be tightened to an adequate tension by applying a specified torque.

Torque wrenches are used for applying a specific torque to such fasteners. Traditional mechanical torque wrenches comprise an internal mechanism (e.g. a lever mechanism) that causes the wrench to signal mechanically when the set torque has been reached.

More recently electronic torque wrenches have been produced. These use a strain gauge to measure the torque that is being applied during use. A digital display allows a user to set the desired nominal torque and a visible or audible signal is given when this is reached.

In many applications, it is necessary from a safety point of view to apply an accurate torque and it is therefore important that torque wrenches are accurately adjusted and the results recorded by means of a calibration with low uncertainty of measurement.

Torque wrenches are usually calibrated by placing them horizontally on a rig which applies an increasing torque, which is measured accurately by a transducer. The wrench is set to a particular nominal setting and the torque at which the wrench signals is then measured and compared with the nominal setting. If there is too great a disagreement (usually expressed as a percentage) the wrench can be adjusted. Multiple measurements of the torque at signal may be taken to ensure that the torque at signal is within a desired tolerance.

In calibration rigs the head of the torque wrench is supported by the transducer and the end of the handle is allowed to rest on a platform which has some form of vertical surface, such as a mechanical stop or reaction post, which resists rotation of the handle in reaction to the torque applied to the head.

The Applicant has appreciated however that in some circumstances in such a set-up, as torque is applied to the head the handle can bend which gives rise to a resultant vertical moment on the handle, causing it to bear onto the support platform with a greater force. This can affect the net torque applied to the wrench and thus increase the uncertainty of the calibration.

The present invention seeks to address the problem set out above and when viewed from a first aspect the invention provides a calibration rig for calibrating a torque wrench, the calibration rig comprising a support structure for supporting the torque wrench during calibration, the support structure comprising:
a support member which is free to move substantially vertically;
means for applying a balance force to the support member, wherein the balance force acts counter to a force exerted by the weight of the torque wrench when a handle of the torque wrench is received by the support member;
means for applying a measured torque to the torque wrench; and
means for resisting rotation of the torque wrench as a result of the applied torque.

The invention further provides a method of calibrating a torque wrench, the method comprising:
placing the torque wrench in a calibration rig comprising a support member such that a handle of said torque wrench is received by the support member, the support member being free to move substantially vertically, wherein the support member is acted upon by a balance force that acts counter to a force exerted by the weight of the torque wrench; and
applying a measured torque to the torque wrench, wherein rotation of the torque wrench as a result of the applied torque is resisted by resisting means.

Thus it will be appreciated by a person skilled in the art that as the support member which receives the handle is free to move vertically and also counters the moment applied to it resulting from the weight of the torque wrench, the support member can support the torque wrench at the required height to eliminate or substantially reduce any resultant moments arising during application of torque during calibration which would otherwise affect the uncertainty of measurement of the calibration.

As with known rigs, the torque wrench may be calibrated by application of the measured torque to the torque wrench. The measured torque may be increased until the torque wrench signals mechanically. However, it will be appreciated that the present invention may be employed for the calibration of torque wrenches that do not signal mechanically when a desired torque is reached. The calibration rig may be adapted to determine when a visible or audible signal is given which indicates that a desired torque has been reached. The calibration rig may comprise a camera for reading the setting of the wrench or the indicated torque measured by the strain gauges from its scale, dial or display.

The balance force applied to the support member may be applied by any suitable means, e.g. a spring; however in a set of preferred embodiments, it is provided by a counterweight. In a set of embodiments, the weight of the counterweight can be varied, e.g. by providing the counterweight in discrete units of mass which may be added or removed as required, so that the calibration rig may be configured for use with different torque wrenches having different weights.

In a set of embodiments the means for resisting rotation of the torque wrench comprises a mechanical stop—i.e. a vertical surface, which may be curved, against which the handle of the torque wrench is intended to bear. The mechanical stop may be, for example, a reaction post. Preferably the mechanical stop is disposed on the support member. In another set of embodiments, the means for resisting rotation of the torque wrench comprises one or more rollers. The roller(s) may be positioned such that rotation of the torque wrench due to the applied measured torque is resisted and also so that any frictional forces acting between the handle of the torque wrench and the rollers results in rotation of the rollers rather than rotation of the torque wrench about its longitudinal axis. In embodiments in which the means for resisting rotation of the torque wrench comprises rollers, the rollers are preferably disposed on the support member.

In some preferred embodiments, the calibration rig may comprise means for adjusting a distance between an axis of rotation of the means for applying a measured torque to the torque wrench and the support member. In other words the support member is adjustable for use with different torque wrenches having different lengths.

The support member could comprise a cradle, slot, clip or any other suitable arrangement for receiving the handle of the torque wrench but is a set of preferred embodiments the support member comprises a platform.

As used herein the term "substantially vertical" is intended to indicate that it is designed to have no significant deviation from true vertical but in practice there may conceivably be an angle of up to 15 degrees.

An exemplary embodiment of the invention will now be described, by way of example only, with reference to the accompanying drawings in which:

FIG. 3 shows a side view of the calibration rig, including a torque wrench mounted therein;

Figure 1:
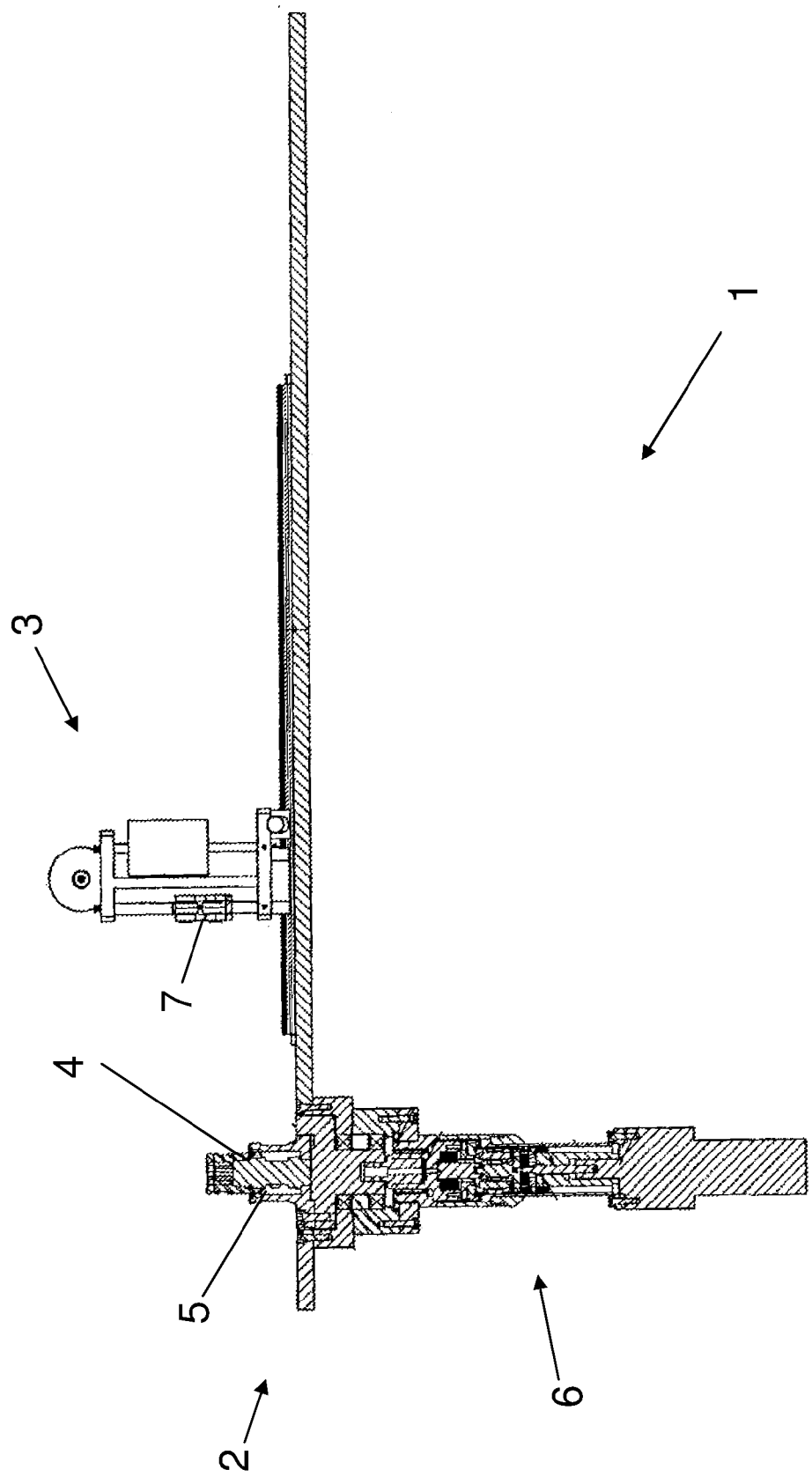
FIG. 1 shows a side view of a calibration rig in accordance with the present invention.

FIG. 1 shows a side view of a calibration rig 1 embodying the invention. It comprises a motorized unit 2 for applying a torque to a torque wrench and a support structure 3 for supporting the weight of the torque wrench. The motorized unit 2 comprises a rotatable socket 4 in a mount 5 connected to an arrangement 6, comprising a transducer, a gearbox and a motor, for rotating the socket 4 to apply a torque to a torque wrench when the stub shaft on the head of the torque wrench is placed into the socket 4.

The support structure 3 comprises a platform 7 for supporting the weight of the torque wrench during calibration. The support structure 3 is described in detail below with reference to FIGS. 5 to 9.

Figure 2:
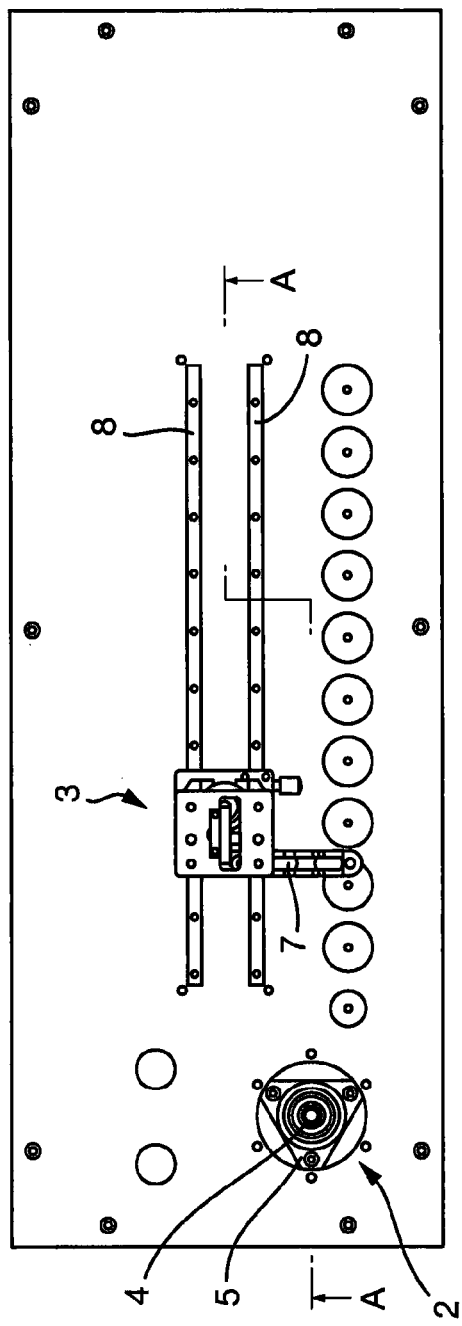
FIG. 2 shows a plan view of the calibration rig.

FIG. 2 shows a plan view of the calibration rig of FIG. 1. The support structure 3 is mounted on runners 8 that permit the adjustment of the horizontal position of the support structure 3 relative to the transducer arrangement 6. Thus when the head of the torque wrench to be calibrated is placed into the socket 4, the position of the platform 7 may be adjusted so that it is properly beneath the torque wrench's handle as may be seen by comparing FIGS. 2 and 4.

Figure 4:
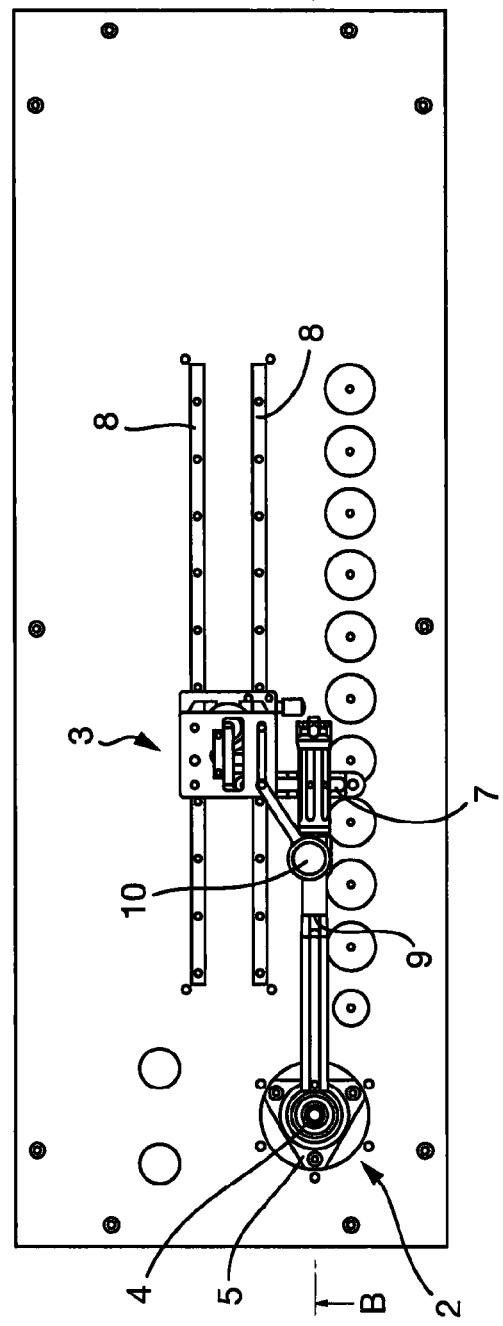
FIG. 4 shows a plan view of the calibration rig and torque wrench.

FIG. 3 shows a side view of the calibration rig of FIG. 1, showing a torque wrench 9 mounted in the calibration rig 1. A camera 10 is disposed on the support structure 3 to facilitate viewing of a scale 11 showing the torque setting applied to or indicated by the wrench during calibration. FIG. 4 shows a plan of the calibration rig as shown in FIG. 3.

Figure 5:
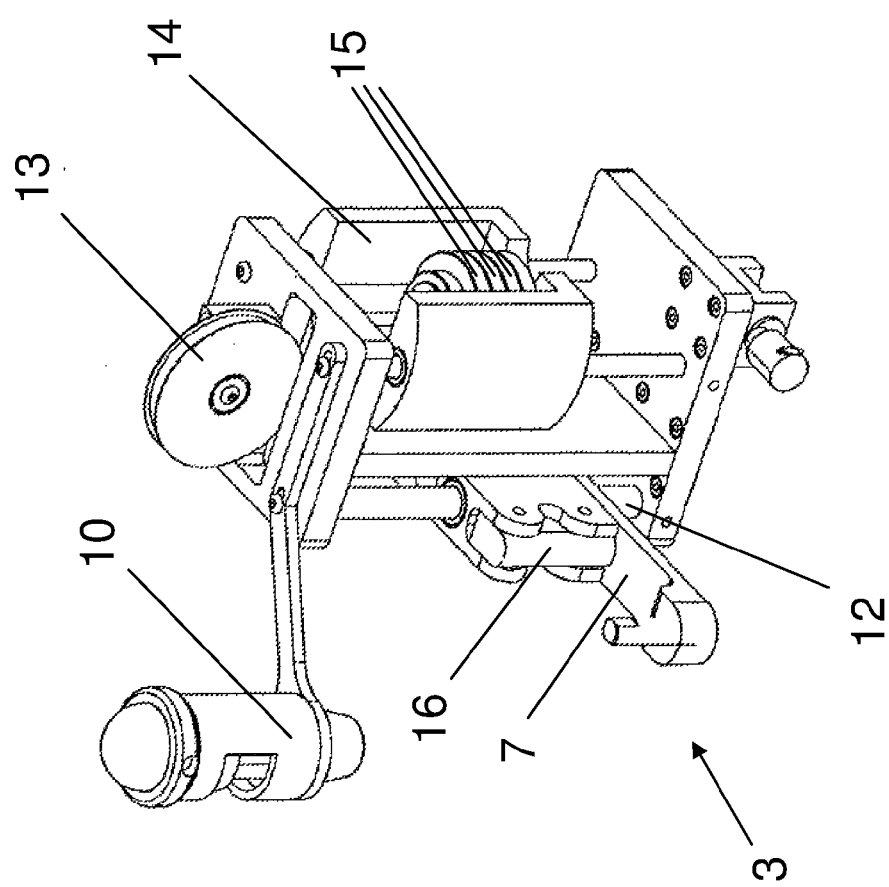
FIG. 5 shows a perspective view of a support structure for supporting a torque wrench comprising a mechanical stop.

FIG. 5 shows a perspective view of the support structure 3. The support structure 3 comprises a platform 7 which receives and supports the handle of the torque wrench. The platform 7 is mounted on vertical shafts 12 to allow the vertical sliding movement of the platform 7. The platform 7 is connected via a cord (not shown) passing over a pulley 13 to a counterweight holder 14 containing counterweights 15. The counterweights 15 are discrete units of mass that may be selected and added to the counterweight holder 14 to balance the weight of the torque wrench. Thus by selecting the correct counterweights 15 to balance the weight of the torque wrench, and by positioning the platform 7 under the handle of the torque wrench, the weight of the torque wrench can be compensated regardless of the vertical position which the handle is made to adopt through bending and substantially without any additional forces being applied to the wrench which might affect the net actual torque applied to it. Thus the uncertainty of measurement of the calibration can be reduced.

A vertical reaction post 16 having a surface curved around its vertical axis is disposed on the platform 7 to resist the motion of the handle under the torque applied by the motorized unit 2 by providing a reaction force when the handle moves towards the reaction post 16. Thus the motorized unit 2 may continue to increase the torque applied to the torque wrench until the torque wrench signals.

When the handle of the torque wrench presses against the reaction post 16, if the surface of the handle does not have a uniform frictional coefficient across its surface (e.g. if regions of the surface are covered with different materials to improve the grip of a user's hand on the handle), the frictional forces between the reaction post 16 and the handle may result in an unbalanced force causing the torque wrench to rotate about its longitudinal axis.

Figure 6:
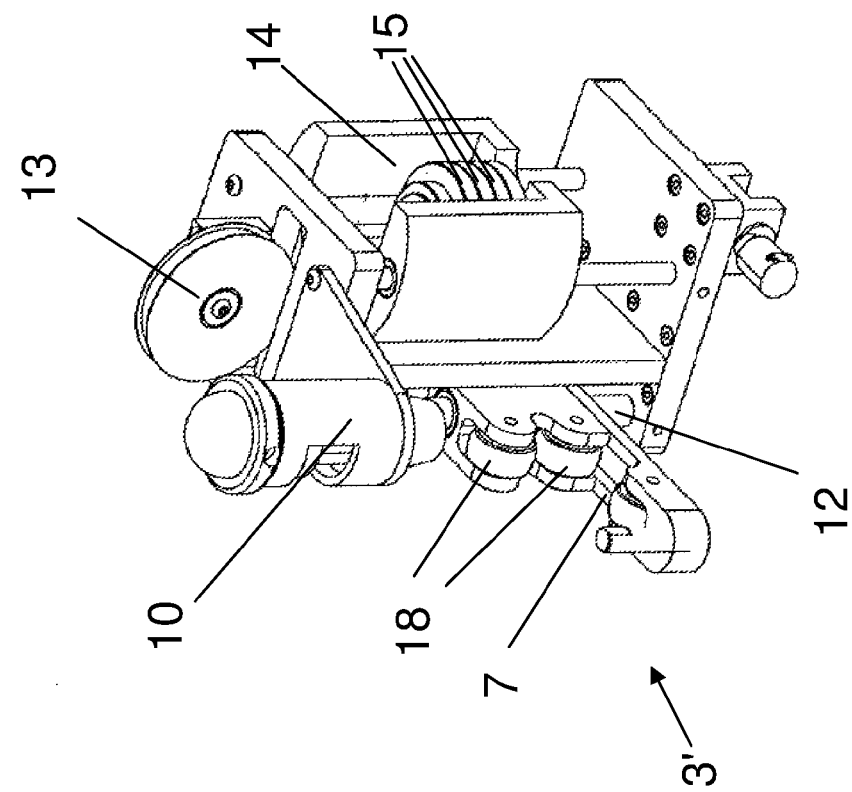
FIG. 6 shows a perspective view of an alternative support structure for supporting a torque wrench comprising rollers.
Figure 9:
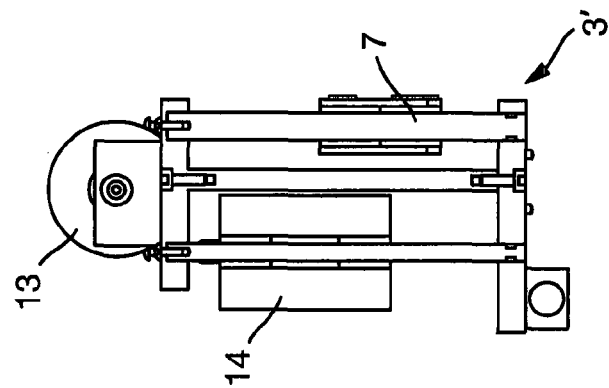
FIG. 9 shows a rear view of the support structure shown in FIG. 6.
Figure 8:
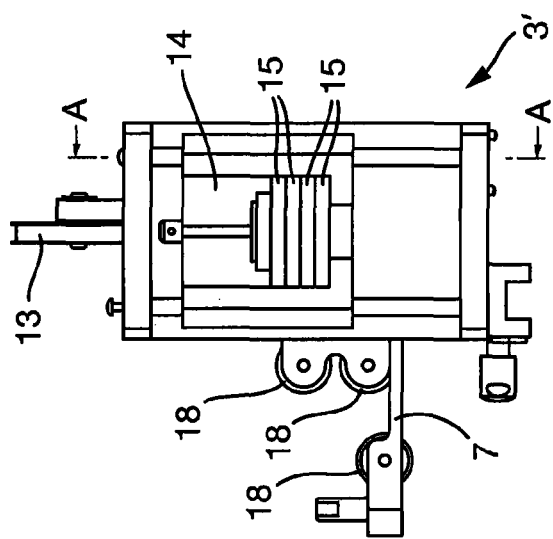
FIG. 8 shows a side view of the support structure shown in FIG. 6.
Figure 7:
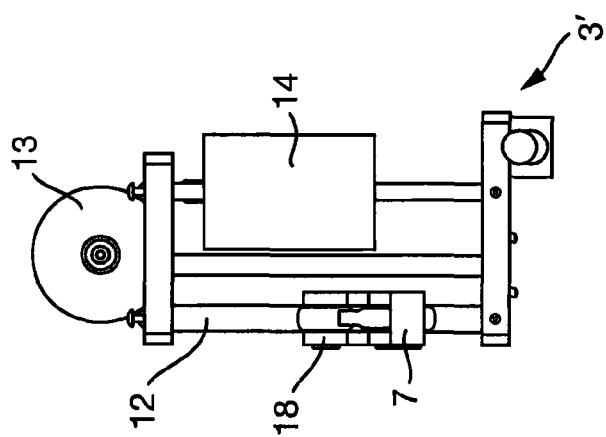
FIG. 7 shows a front view of the support structure shown in FIG. 6.

An alternative embodiment of the support structure 3' is shown in perspective in FIG. 6, wherein rollers 18 are provided instead of the reaction post 16. The rollers 18 resist the rotation of the torque wrench under the applied torque and thus perform the function of the reaction post 16. However, as the rollers 18 are free to rotate under any frictional forces between the handle and the rollers, the rollers 18 also help to avoid rotation of the torque wrench about its longitudinal axis when it is pressed against them. Front, side and rear view of this embodiment of the support structure 3' are shown in FIGS. 7, 8 and 9 respectively.

The invention claimed is:

1. A calibration rig for calibrating a torque wrench, the calibration rig comprising a support structure for supporting the torque wrench during calibration, the support structure comprising:
    a horizontal support member arranged to support the torque wrench in a vertical force-neutral position during calibration by being free to move substantially vertically upwards or downwards during application of torque during calibration;
    an arrangement for applying a vertical balance force to the horizontal support member, wherein the vertical balance force acts counter to a vertical force exerted by a weight of the torque wrench when a handle of the torque wrench is received by the horizontal support member;
    an arrangement for applying a measured torque to the torque wrench; and
    an arrangement for resisting rotation of the torque wrench as a result of application of the measured torque;
    wherein vertical is parallel to a direction of gravitational force applied to the calibration rig, and horizontal is orthogonal to vertical.

2. A calibration rig as claimed in claim 1, wherein the arrangement for applying said vertical balance force comprises a spring or counterweight.

3. A calibration rig as claimed in claim 2 wherein the arrangement for applying said vertical balance force comprises a counterweight, and a weight of the counterweight is variable.

4. A calibration rig as claimed in claim 1 wherein the arrangement for resisting rotation of the torque wrench comprises a mechanical stop.

5. A calibration rig as claimed in claim 1 wherein the arrangement for resisting rotation of the torque wrench comprises rollers.

6. A calibration rig as claimed in claim 1 wherein the support structure is positionally adjustable to accommodate different lengths of torque wrench.

7. A calibration rig as claimed in claim 1 wherein the horizontal support member comprises a platform.

8. A method of calibrating a torque wrench, the method comprising:
   placing the torque wrench in a calibration rig comprising a horizontal support member such that a handle of said torque wrench is received by the horizontal support member, the horizontal support member arranged to support the torque wrench in a vertical force-neutral position during calibration by being free to move substantially vertically upward or downwards during application of torque during calibration, wherein the horizontal support member is acted upon by a vertical balance force that acts counter to a vertical force exerted by a weight of the torque wrench; and
   applying a measured torque to the torque wrench, wherein rotation of the torque wrench as a result of the application of the measured torque is resisted by a resisting arrangement;
   wherein vertical is parallel to a direction of gravitational force applied to the calibration rig, and horizontal is orthogonal to vertical.

9. A method as claimed in claim 8, wherein the vertical balance force is provided by a spring or counterweight.

10. A method as claimed in claim 9 wherein the vertical balance force is provided by a counterweight, and a weight of the counterweight is variable.

11. A method as claimed in claim 8 wherein the resisting arrangement comprises a mechanical stop.

12. A method as claimed in claim 8 wherein the resisting arrangement comprises rollers.

13. A method as claimed in claim 8 comprising adjusting a position of the horizontal support member according to a length of the torque wrench.

14. A method as claimed in claim 8 wherein the horizontal support member comprises a platform.

15. A calibration rig as claimed in claim 1, configured to cause the handle to rotate horizontally.

16. A calibration rig as claimed in claim 1 wherein the horizontal support member is arranged such that the horizontal support member does not exert any resultant vertical moments on the handle.

17. A method as claimed in claim 10 wherein the handle rotates horizontally.

18. A method as claimed in claim 10 wherein the horizontal support member does not exert any resultant vertical moments on the handle.

19. A calibration rig for calibrating a torque wrench, the calibration rig comprising a support structure for supporting the torque wrench during calibration, the support structure comprising:
   a horizontal support member arranged to support the torque wrench in a vertical force-neutral position during calibration; wherein the horizontal support member is acted on by an arrangement for applying a vertical balance force to the horizontal support member, wherein the vertical balance force acts counter to a vertical force exerted by a weight of the torque wrench when a handle of the torque wrench is received by the horizontal support member; wherein the horizontal support member is free to move substantially vertically upwards or downwards during application of torque to the torque wrench so as to provide force-neutral support regardless of a vertical position the horizontal support member is made to adopt during calibration; and wherein vertical is parallel to a direction of gravitational force applied to the calibration rig, and horizontal is orthogonal to vertical;
   an arrangement for applying a measured torque to the torque wrench; and
   an arrangement for resisting rotation of the torque wrench as a result of application of the measured torque.

20. A calibration rig for calibrating a torque wrench, the calibration rig comprising a support structure for supporting the torque wrench during calibration, the support structure comprising:
   a horizontal support member arranged to support a handle of the torque wrench during calibration, wherein the horizontal support member is arranged to move vertically upwards or downwards with the handle of the torque wrench during application of torque to the torque wrench;
   a counterbalance arrangement configured to apply a vertical balance force to the horizontal support member, wherein the vertical balance force acts counter to a vertical force exerted by a weight of the torque wrench when the handle of the torque wrench is received by the horizontal support member;
   an arrangement for applying a measured torque to the torque wrench; and
   an arrangement for resisting rotation of the torque wrench as a result of application of the measured torque;
   wherein vertical is parallel to a direction of gravitational force applied to the calibration rig, and horizontal is orthogonal to vertical.

21. A calibration rig as claimed in claim 20, where the horizontal support member is configured to move to any vertical position the horizontal support member is made to adopt during calibration.

* * * * *